US011492075B2

(12) United States Patent
Shirasuna et al.

(10) Patent No.: US 11,492,075 B2
(45) Date of Patent: Nov. 8, 2022

(54) STRADDLE TYPE ELECTRIC VEHICLE

(71) Applicant: HONDA MOTOR CO., LTD., Tokyo (JP)

(72) Inventors: Takamori Shirasuna, Wako (JP); Makoto Fujikubo, Wako (JP); Kazuya Atsumi, Wako (JP); Yoshihiro Nomura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 17/014,886

(22) Filed: Sep. 8, 2020

(65) Prior Publication Data

US 2020/0398933 A1    Dec. 24, 2020

Related U.S. Application Data

(63) Continuation of application No. PCT/JP2018/013422, filed on Mar. 29, 2018.

(51) Int. Cl.
| | |
|---|---|
| *B62M 7/06* | (2006.01) |
| *B62J 43/28* | (2020.01) |
| *B62J 43/16* | (2020.01) |
| *B62J 99/00* | (2020.01) |
| *B62K 19/36* | (2006.01) |
| *B62K 25/28* | (2006.01) |
| *B62J 1/08* | (2006.01) |
| *B62K 11/04* | (2006.01) |

(52) U.S. Cl.
CPC .................. *B62M 7/06* (2013.01); *B62J 1/08* (2013.01); *B62J 43/16* (2020.02); *B62J 43/28* (2020.02); *B62K 11/04* (2013.01); *B62J 99/00* (2013.01); *B62K 19/36* (2013.01); *B62K 25/283* (2013.01); *B62K 2204/00* (2013.01)

(58) Field of Classification Search
CPC ............. B62M 7/06; B62J 43/16; B62J 43/28
USPC ........................................................ 180/220
See application file for complete search history.

(56) References Cited

U.S. PATENT DOCUMENTS

| 5,501,292 A | 3/1996 | Kawashima et al. |
| 5,657,830 A | 8/1997 | Kawashima et al. |
| (Continued) | | |

FOREIGN PATENT DOCUMENTS

| CN | 101172504 A | 5/2008 |
| CN | 102464071 A | 5/2012 |
| (Continued) | | |

OTHER PUBLICATIONS

Chinese Office Action (with partial translation) for Chinese Patent Application No. 201880091163.1 dated Apr. 30, 2021.
(Continued)

*Primary Examiner* — Kevin Hurley
*Assistant Examiner* — Hosam Shabara
(74) *Attorney, Agent, or Firm* — Thomas | Horstemeyer, LLP

(57) ABSTRACT

A straddle type electric vehicle comprises a main frame, a motor unit including an electric motor, and a battery that supplies power to the motor unit. The main frame includes a left and right pair of portions. The motor unit is disposed overlapping the main frame in a side view of the vehicle. A motor shaft of the electric motor is disposed above the pivot shaft and rearward in the vehicle longitudinal direction.

6 Claims, 7 Drawing Sheets

(56) References Cited

U.S. PATENT DOCUMENTS

| | | |
|---|---|---|
| 8,453,782 B2 | 6/2013 | Kondo et al. |
| 8,783,405 B2 | 6/2014 | Irie et al. |
| 8,960,355 B2 | 2/2015 | Matsuda |
| 8,973,697 B2 | 3/2015 | Matsuda |
| 9,160,214 B2 | 10/2015 | Matsuda |
| 9,278,725 B2 | 3/2016 | Matsuda |
| 9,290,226 B2 | 3/2016 | Nitta |
| 9,308,957 B2 | 4/2016 | Matsuda |
| 9,457,869 B2 | 10/2016 | Kashiwai et al. |
| 2010/0259026 A1* | 10/2010 | Patmont .......... B62K 25/16 280/124.169 |
| 2012/0103706 A1 | 5/2012 | Kondo et al. |
| 2012/0111651 A1 | 5/2012 | Irie et al. |
| 2013/0270025 A1 | 10/2013 | Matsuda |
| 2013/0270038 A1 | 10/2013 | Nitta |
| 2013/0270938 A1 | 10/2013 | Matsuda |
| 2013/0277133 A1 | 10/2013 | Matsuda |
| 2013/0319782 A1 | 12/2013 | Matsuda |
| 2014/0318880 A1 | 10/2014 | Kashiwai et al. |
| 2015/0008061 A1 | 1/2015 | Matsuda |

FOREIGN PATENT DOCUMENTS

| | | |
|---|---|---|
| CN | 103237717 A | 8/2013 |
| CN | 103237719 A | 8/2013 |
| CN | 104066644 A | 9/2014 |
| JP | H04151389 A | 5/1992 |
| JP | 2012101679 A | 5/2012 |
| WO | 2012063291 A1 | 5/2012 |
| WO | 2012090245 A1 | 7/2012 |
| WO | 2012090463 A1 | 7/2012 |
| WO | 2013098894 A1 | 7/2013 |
| WO | 2019186947 A1 | 10/2019 |

OTHER PUBLICATIONS

International Search Report for PCT/JP2018/013422 dated Jun. 19, 2018.

* cited by examiner

STRADDLE TYPE ELECTRIC VEHICLE

CROSS-REFERENCE TO RELATED APPLICATION

This application is a continuation of International Patent Application No. PCT/JP2018/013422 filed on Mar. 29, 2018.

BACKGROUND OF THE INVENTION

Field of the Invention

The present invention relates to a straddle type electric vehicle.

Description of the Related Art

A known straddle type electric vehicle using an electric motor as the drive power source includes a straddle type electric vehicle installed with a battery that supplies power to an electric motor and control unit that controls the power supplied from the battery to the electric motor (for example, International Publication No. 2012/063291).

SUMMARY OF THE INVENTION

In a straddle type electric vehicle in which power is supplied from a battery to an electric motor, cruising distance depends on the capacity of the battery. Thus, ensuring space for housing a larger battery is desirable.

An embodiment of the present invention provides a straddle type electric vehicle in which more housing space for a battery can be ensured.

Solution to Problem

According to an embodiment of the present invention, provided is a straddle type electric vehicle comprises: a front wheel and a rear wheel; a head pipe that supports a steering mechanism for steering the front wheel; a main frame that is connected to the head pipe, and that extends in a vehicle longitudinal direction; a motor unit including an electric motor that outputs a driving force to rotate the rear wheel; a battery that supplies power to the motor unit; and a swing arm swingably supported by a pivot shaft provided on the main frame, the swing arm rotatably supporting the rear wheel, wherein the motor unit and the battery are supported by the main frame between the front wheel and the rear wheel, wherein the main frame includes a left and right pair of portions, the motor unit is located between the left and right pair of portions in a top view of the vehicle and is disposed overlapping the main frame in a side view of the vehicle, and wherein a motor shaft of the electric motor is disposed above the pivot shaft and rearward in the vehicle longitudinal direction.

Further features of the present invention will become apparent from the following description of exemplary embodiments (with reference to the attached drawings).

DESCRIPTION OF THE EMBODIMENTS

Figure 1:
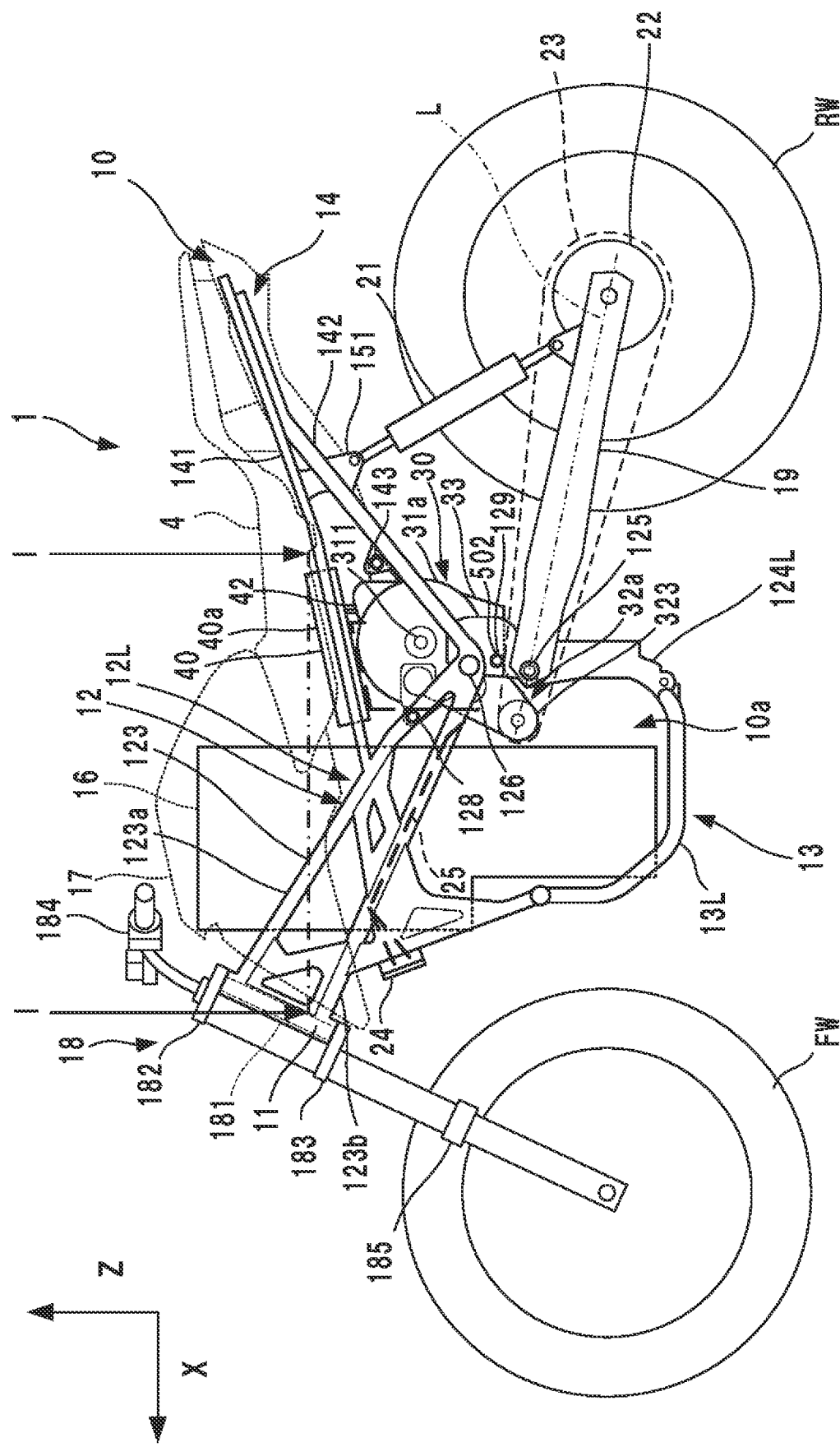
FIG. 1 is a left side view of a straddle type electric vehicle according to an embodiment.

A straddle type vehicle according to an embodiment of the present invention will be described with reference to the drawings. In the drawings, arrows X. Y, and Z indicate directions orthogonal to one another, with the X direction indicating the front-and-rear direction of the straddle type vehicle, the Y direction indicating the vehicle width direction (lateral direction) of the straddle type vehicle, and the Z direction indicating the vertical direction. Hereinafter, the front and rear of the front-and-rear direction of the straddle type vehicle may be simply referred to as "front" and "rear", and the inner side and outer side in the vehicle width direction (lateral direction) of the straddle type vehicle may be simply referred to as "inner side" and "outer side". Also, when describing a left and right pair of components, one of the left and right pair may be not illustrated or the description thereof may be omitted.

SUMMARY OF THE STRADDLE TYPE VEHICLE

FIG. 1 is a left side view of a straddle type electric vehicle 1 according to an embodiment of the present invention. The same drawing is a schematic view with a main portion of the straddle type electric vehicle 1 centered. Hereinafter, the straddle type electric vehicle 1 may be referred to as the vehicle 1.

The vehicle 1 is provided with a vehicle body frame 10 that includes a head pipe 11 provided in a vehicle front portion; a main frame 12 connected to the head pipe 11 and extending in the front-and-rear direction; a down frame 13 extending in the front-and-rear direction downward from the main frame 12, and a seat frame 14 extending rearward from the main frame 12. Also, the main frames 12 are connected at rear end portions thereof and the down frames 13 are connected at rear end portions thereof.

Figure 2:
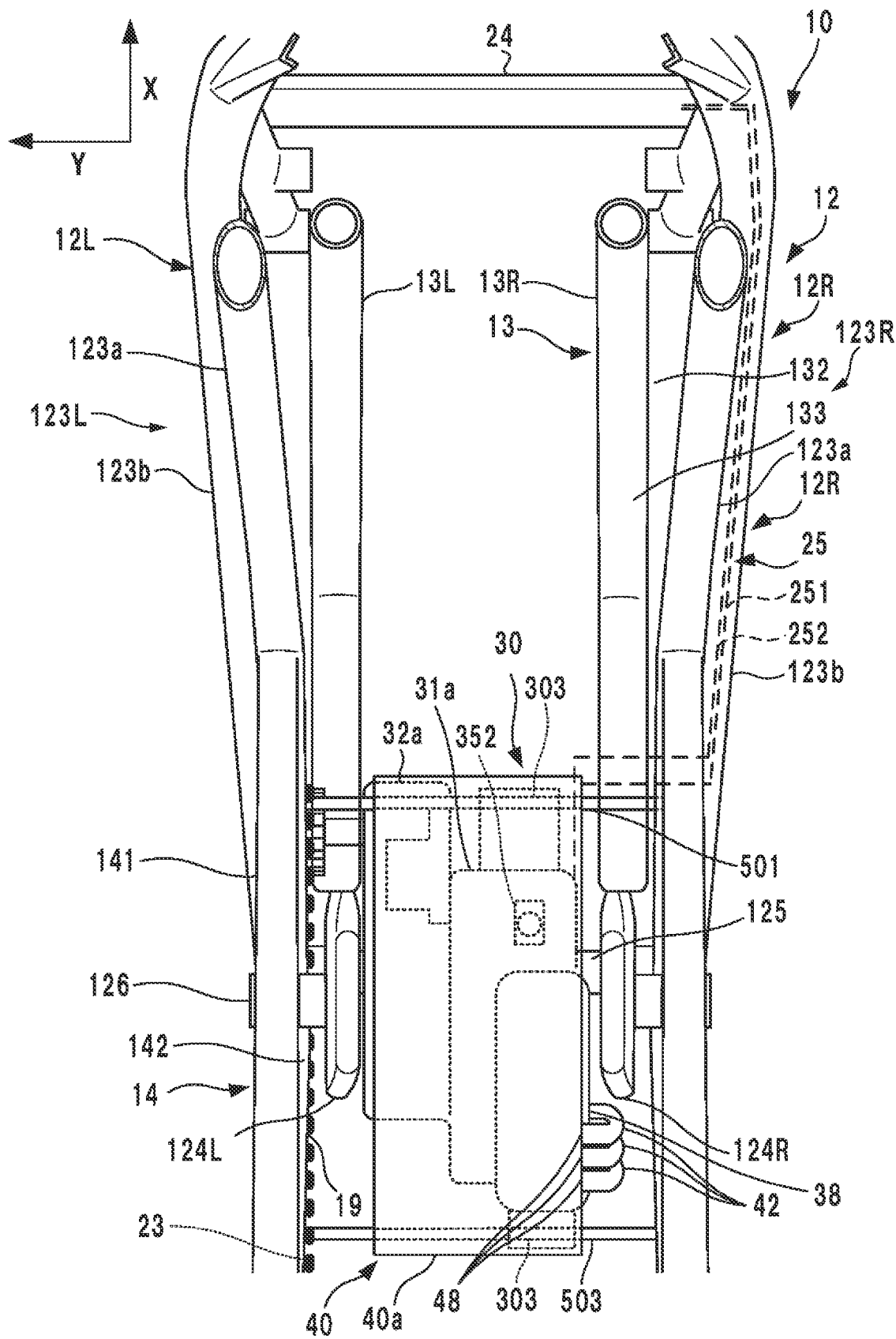
FIG. 2 is a cross-sectional view taken along line I-I of FIG. 1 with some components omitted.

Next, FIG. 2 as well as FIG. 1 will be referenced. FIG. 2 is a cross-sectional view taken along line I-I of FIG. 1 with some components omitted. The main frame 12 of the present embodiment includes a main frame 12L extending on the left side of the vehicle 1 from the head pipe 11 and a main frame 12R extending on the right side of the vehicle 1 from the head pipe 11. The frames are formed separated in the vehicle width direction (on the left and right). The main frames 12L, 12R include a left and right pair of backbone frames 123L, 123R and a left and right pair of pivot frames 124L, 124R. Hereinafter, the left and right pair of backbone frames 123L. 123R may be simply referred to as the backbone frame 123, and the left and right pair of pivot frames 124L, 124R may be simply referred to as the pivot frame 124. (Hereinafter, provided left and right pairs may be treated the same).

The backbone frame 123 of the present embodiment includes an upper portion 123a extending from an upper portion of the head pipe 11 rearwardly downward with respect to the vehicle and a lower portion 123b extending from a lower portion of the head pipe 11 rearwardly downward with respect to the vehicle. The upper portion 123*a* and the lower portion 123*b* are connected at a rear end portion 126 of the backbone frame 123 or connected at a midway portion. With this configuration, weight reduction can be achieved and the rigidity of the main frame 12 can be increased.

Note that in the present embodiment, the main frame 12 is divided to the left and right from the head pipe 11 and extends rearwardly downward with respect to the vehicle, forming the main frames 12L, 12R along the entire region of the main frame 12. However, other configurations may be employed, including configurations in which a single frame portion extends rearward from the head pipe 11 and branches to the left and right and configurations in which the frame portion does not branch. Also, the backbone frame 123 in the present embodiment includes the upper portion 123*a* extending rearward from an upper portion of the head pipe 11 and the lower portion 123*b* extending rearward from a lower portion, both divided to the left and right. However, a configuration may be employed in which a single portion on the left and right extends rearward from the head pipe 11.

The left and right pivot frames 124L, 124R are formed extending downward from the rear end portions 126 of the backbone frames 123L, 123R, respectively, and connect at lower ends to rear ends of the down frames 13. Note that the backbone frame 123 and the pivot frame 124 may be integrally formed or may be separate members joined via metallurgical bonding such as welding, mechanical joining such as bolt fastening, or the like.

A left and right pair of down frames 13L, 13R are provided extending in the vehicle front-and-rear direction downward from the main frame 12. The down frames 13L, 13R extend from lower portions of the main frames 12 downward to lower ends, extend from the lower end rearward, and connect to lower ends of the pivot frames 124L, 124R.

In the present embodiment, the down frame 13 extends downward from a lower portion of the main frame 12. However, a configuration may be employed in which the down frame 13 extends downward from the head pipe 11. Also, the down frame 13 is formed divided into the down frame 13L and the down frame 13R along the entire region of the down frame 13. However, a configuration may be employed in which a single frame extends downward from the head pipe 11 or the main frame 12 and then branches to the left and right.

The seat frame 14 is provided extending rearward from the main frames 12L, 12R and includes a left and right pair of seat rails 141 that support a seat 4. Also, a left and right pair of support frames 142 are provided, downward from the left and right pair of seat rails 141 and connect to the main frames 12 and the left and right pair of seat rails 141. The left and right pair of support frames 142 are each provided with an attachment portion 151 where a left and right pair of rear suspensions 21 are attached. Note that in the present embodiment, the rear suspension 21 is a left and right pair. However, a link type suspension may be provided between the motor unit 30 and the rear wheel RW for connecting together a single rear suspension and a rear swing arm 19 via a link.

The head pipe 11 supports a steering mechanism 18 for steering a front wheel FW. The steering mechanism 18 includes a steering stem 181 is turnably supported on the head pipe 11, and a top bridge 182 is attached to an upper end portion of the steering mechanism 18 and a bottom bridge 183 is attached to a lower end portion of the steering mechanism 18. The top bridge 182 is provided with a handle 184 for a driver to steer the front wheel FW. A left and right pair of front forks 185 are supported by the top bridge 182 and the bottom bridge 183. The front forks 185 extend frontwardly downward with respect to the vehicle, and the front wheel is rotatably supported on lower ends thereof.

The rear swing arm 19, at a front end portion, is swingably supported by a pivot shaft 125 provided in the pivot frames 124. At a rear end portion of the rear swing arm 19, a rear wheel RW is rotatably supported, and the rear wheel RW is rotationally driven by a chain 23 wound around a drive sprocket 323 of a motor unit 30 and a driven sprocket 22 of the rear wheel RW. The rear swing arm 19 includes a left and right pair of portions, and the left and right portions include, at upper portions thereof, support portions 191 that supports the rear suspensions 21, the rear suspensions 21 dampening the swing here.

Figure 3:
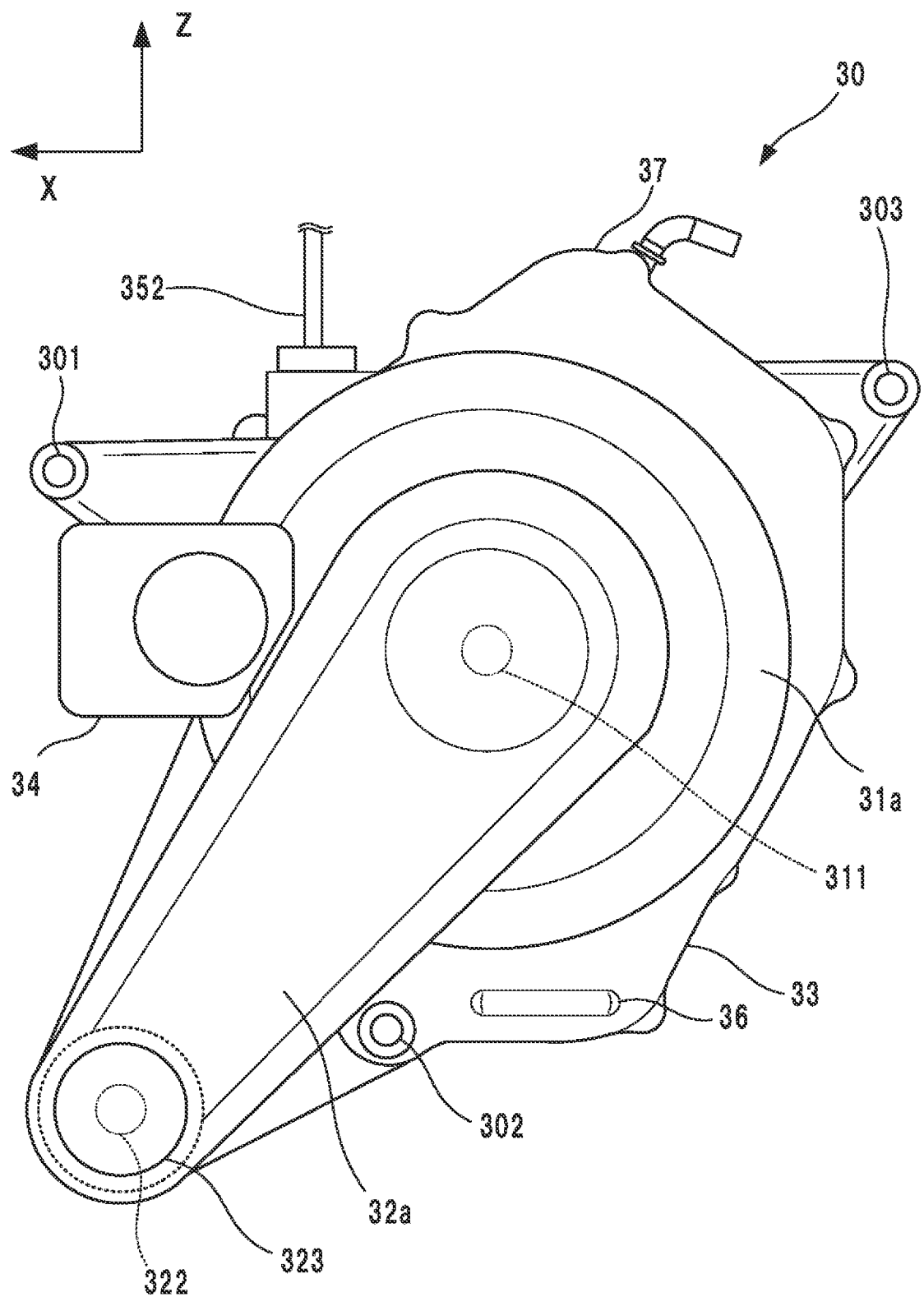
FIG. 3 is a front view schematically illustrating a motor unit according to an embodiment.
Figure 4:
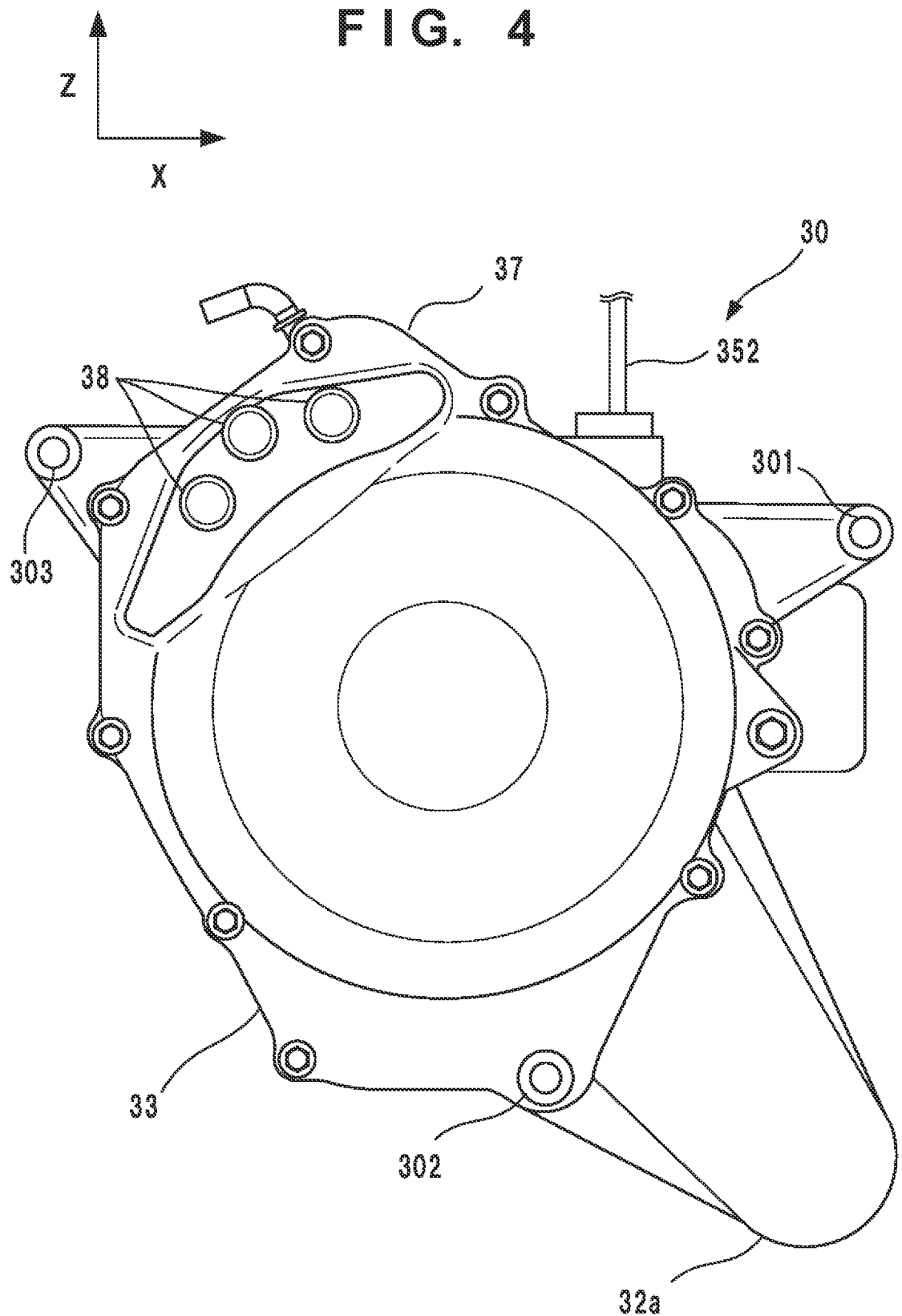
FIG. 4 is a back view schematically illustrating a motor unit of FIG. 3.
Figure 5:
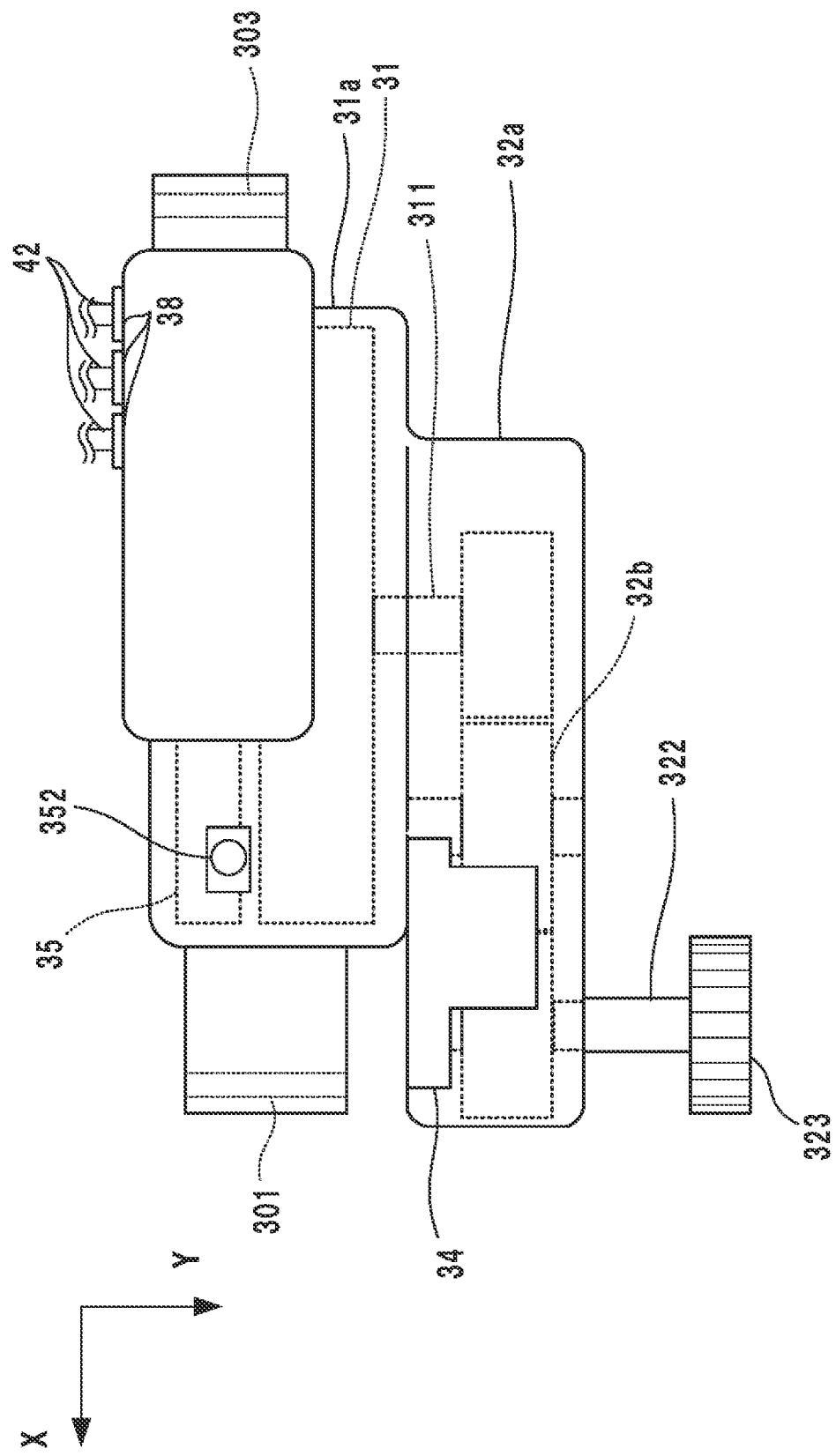
FIG. 5 is atop view of the motor unit of FIG. 3 schematically illustrating an inner portion.

Next, FIGS. 3 to 5 as well as FIGS. 1 and 2 will be referenced. FIG. 3 is a front view schematically illustrating the motor unit 30. FIG. 4 is a back view schematically illustrating an inner portion of the motor unit 30. Also, FIG. 5 is a top view schematically illustrating an inner portion of the motor unit 30.

The motor unit 30 includes an electric motor 31 that outputs a driving force to rotate the drive sprocket 323. Also, the electric motor 31 is housed in a motor housing portion 31*a*. In the present embodiment, the axial direction of a motor shaft 311 of the electric motor and the vehicle width direction are aligned, and the drive sprocket 323, which is the output portion of the motor unit 30 is disposed with a front surface facing to the left.

Also, the motor unit 30 includes a deceleration portion 32 for decelerating the driving force for rotating the electric motor 31. The deceleration portion 32 includes a case portion 32*a* that projects outward from the motor housing portion 31*a* in the vehicle width direction, a reduction gear 32*b* for decelerating the rotation of the motor shaft 311, and an output shaft 322 for outputting a rotational driving force after deceleration via the reduction gear 32*b*. In the present embodiment, the output shaft 322 is provided downward from the motor shaft 311 and frontward from the motor shaft 311 in the vehicle longitudinal direction. Also, the drive sprocket 323 is attached to the output shaft 322 of the deceleration portion 32.

An oil pan 33 is formed on a bottom portion of the motor unit 30. Oil collected in the oil pan 33 is taken in by an oil pump 34 and discharged to lubricate and cool the inner portion of the motor unit 30. The oil supplied to the inner portions of the motor unit 30 is returned to the oil pan 33 via the oil dropping naturally.

The motor unit 30 includes, on an upper portion thereof and the side where the deceleration portion 32 is disposed, a breather chamber 37 for connecting the motor unit 30 to the outside and for gas-liquid separation. Also, the motor unit 30 includes an oil filter 36 that removes impurities in the oil circulating in the motor unit 30.

A battery 16 stores power that is supplied to the motor unit 30. A control unit 40 executes, in accordance with an acceleration operation and the like by the driver, control (drive control) of the supply of power, with the battery 16 as a power source, to the motor unit 30, and in particular to the electric motor 31. The motor unit 30 and the control unit 40 are connected by an electric connection member 42, and power is supplied from the control unit 40 to the motor unit 30 via the electric connection member 42. In the present embodiment, wire is used as the electric connection member 42. However, another connection member, such as a bus bar, capable of transferring electric signals may be employed. Also, the motor unit 30 and the control unit 40 generate heat when driven. However, a heat exchanger 24 and a circulating cooling medium cools the motor unit 30 and the control unit 40, helping to prevent the motor unit 30 and the control unit 40 reaching a high temperature.

Arrangement Configuration of the Motor Unit and the Control Unit FIGS. 1 and 2 will be referenced. In the present embodiment, a housing portion 10a of the battery 16 is mainly defined by the main frames 12 and the down frames 13. In the present embodiment, the housing portion 10a on the left side in the vehicle width direction is defined by the head pipe 11, the main frame 12L, and down frame 13L connected in a loop-like shape, and the housing portion 10a on the right side in the vehicle width direction is defined in a similar manner by the head pipe 11, the main frame 12R, and the down frame 13R connected in a loop-like shape. With this loop-shaped frame, the protection performance of the sides of the battery 16 can be increased. The lower limit of the housing portion 10a in the vertical direction is defined by the down frames 13, and on the upper side, with the vehicle body frame 10 being open, the housing portion 10a is defined by a cover member 17.

Also, the battery 16 is disposed, as viewed in a top view of the vehicle, between the backbone frames 123L, 123R, and is supported by the backbone frames 123L, 123R and the down frames 13L, 13R via a non-illustrated fixing structure. Also, only the battery 16 is disposed projecting higher than the backbone frames 123 and covered by the cover member 17. Because the battery 16 projects higher than the backbone frames 123, a larger battery can be installed.

In the present embodiment, the following structure is employed to create more housing space for the battery 16 inside the housing portion a. In other words, in the present embodiment, the motor unit 30 is disposed overlapping the main frame 12 in a side view of the vehicle, and the motor shaft 311 of the electric motor is disposed upward and rearward in the vehicle longitudinal direction from the pivot shaft 125 provided on the pivot frame 124. Thus, the space between the main frames 12 in the housing portion 10a can be used as space to dispose the motor unit 30 in, allowing the remaining space to be used as battery housing space. In the present embodiment, the motor unit 30 is disposed overlapping a rear portion of the backbone frame 123 and the pivot frame 124. By disposing the motor unit 30 overlapping the pivot frame 124, the motor unit 30 can be disposed more to the rear. This can create more housing space for the battery 16 in portion on the front side of the housing portion 10a. Also, in the portion on the front side of the housing portion 10a, the battery 16 can be disposed all the way to a lower end region defined by the down frame 13. In this way, the battery 16 can be disposed further to the lower side, lowering the center of gravity.

Also, in the present embodiment, the motor shaft 311 is disposed upward and rearward from the pivot shaft 125. Thus, a portion of the motor unit 30 is disposed outside of the housing portion 10a. This can create more housing space for the battery 16 in the space of the housing portion 10a. Also, because the motor shaft 311 is disposed rearward from the pivot shaft 125, the battery 16, which is a heavy object, can be centrally disposed with respect to the main frame 12. This allows the center of gravity of the vehicle in the front-and-rear direction to be set more centrally. Furthermore, because the motor shaft 311 is disposed upward from the pivot shaft 125, the motor unit 30 can be protected from external disturbances, such as flying stones and other flying objects.

Note that in the present embodiment, the motor unit 30 overlaps the backbone frame 123 and the pivot frame 124 in a side view of the vehicle. However, configurations in which the motor unit 30 only overlaps the backbone frame 123 or only overlaps the pivot frame 124 may be employed.

Figure 6:
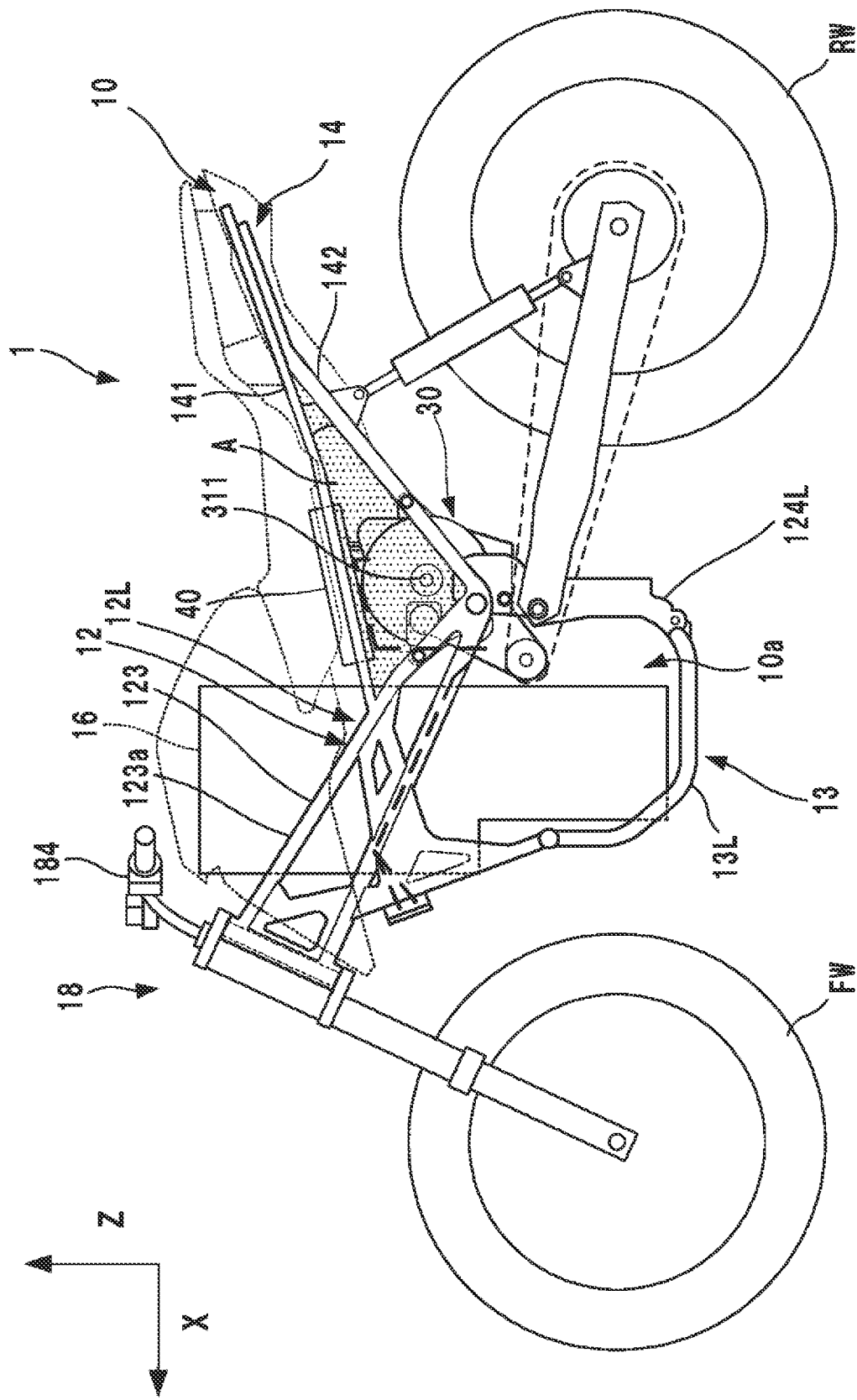
FIG. 6 is a left side view of a straddle type electric vehicle illustrating an arrangement region of a motor unit.

FIG. 6 will be referenced. FIG. 6 is a left side view of the straddle type electric vehicle illustrating an arrangement region of the motor unit. In the present embodiment, the motor shaft 311 of the motor unit 30, in a side view of the vehicle, is disposed inside a region A surrounded by the backbone frame 123, the seat rail 141, and the support frame 142. Because the motor unit 30 can be disposed in the space beneath the seat 4 in this way, more housing space for the battery 16 can be created in the space inside the housing portion 10a.

Note that in the present embodiment, the motor unit 30, in a side view of the vehicle, is disposed downward from the seat rail 141 and overlapping the support frame 142. However, other configurations may be employed, including a configuration in which the motor unit 30 is disposed upward from the support frame 142 and overlapping the seat rail 141 or a configuration in which the motor unit 30 is disposed overlapping the seat rail 141 and the support frame 142.

In the present embodiment, the motor unit 30 is disposed with the motor shaft 311 located rearward from the pivot shaft 125 and the output shaft 322 located frontward from the pivot shaft 125. In other words, the pivot shaft 125 is provided between the motor shaft 311 and the output shaft 322 in the vehicle longitudinal direction. Also, in the present embodiment, with a driver on the vehicle 1 and the vehicle 1 at a position stopped (with the forces that act on the vehicle body when accelerating and decelerating not acting on the vehicle body) and stood upright, the axle of the rear wheel RW, the pivot shaft 125, and the output shaft 322 are disposed aligned on a single straight line (on straight line L of FIG. 1). By disposing these components aligned on a single straight line, the power transfer efficiency can be improved.

Also, the motor unit 30, in a side view of the vehicle, is disposed with the oil pan 33 projecting rearward from the main frame 12. In this way, traveling winds and the like easily come into contact with the oil pan 33, allowing the cooling efficiency of the oil to be improved. In the present embodiment, the motor unit 30, in a side view of the vehicle, is disposed with the oil pan 33 disposed rearward from the pivot frame 124 and projecting downward from the support frame 142. In this way, traveling winds and the like more easily come into contact with the oil pan 33, allowing the cooling efficiency of the oil to be further improved.

Also, the control unit 40, in a side view of the vehicle, is disposed upward from and close to the motor unit 30. Because the motor unit 30 and the control unit 40 are disposed close to one another, the electric connection member 42 connecting the motor unit 30 and the control unit 40 can be shortened. In the present embodiment, the electric connection member 42 connects together a motor side connection portion 38 provided on a back surface (the surface facing the vehicle right side when assembled) of the motor unit 30 and a control unit side connection portion 48 provided on a surface of the control unit 40 facing the vehicle right side. However, the configuration of the connection position of the electric connection member 42 is not limited thereto. For example, the electric connection member 42 may be shortened by connecting together an upper surface of the motor unit 30 and a lower surface of the control unit 40. Also, in the present embodiment, the control unit 40 is disposed overlapping the seat rail 141 in a side view of the vehicle. This allows the side of the control unit 40 to be protected.

Inside the motor unit 30, a resolver 35 is provided that detects a rotation angle of the electric motor 31. Also, an upper portion of the motor unit 30 and a downward facing surface of the control unit 40 are connected via a wire harness 352 capable of transferring electric signals. An electric signal based on a detection result of the resolver 35 is transferred from the motor unit 30 to the control unit 40 via the wire harness 352. Because the wire harness 352 is provided on an upper portion of a vehicle front facing surface of the motor unit 30, the wire harness 352 can be disposed outside of an area in which the rear swing arm 19 can swing. Also, because the wire harness 352 connects to the upper portion of the motor unit 30, the wire harness 352 can be prevented from being submerged in water and the like.

Also, the motor unit 30 is disposed between the seat rails 141 in a top view of the vehicle. Because the motor unit 30 is disposed between the seat rails 141 in a top view of vehicle, interference between the motor unit 30 and the legs of an occupant, when the occupant grips with their legs, can be prevented.

Next, the attachment structure of the motor unit 30 will be described. The motor unit 30 is fixed to an attachment portion 128 provided on the backbone frame, an attachment portion 129 provided on the pivot frame 124, and the attachment portion 143 provided on the support frame 142. Because the motor unit 30 is supported by the highly rigid vehicle body frame 10 at three points, the attachment portion 128, the attachment portion 129, and the attachment portion 143, the attachment rigidity of the motor unit 30 can be improved. Also, because the surface of the motor unit 30 facing the vehicle width direction is surrounded by the vehicle body frame 10, the protection performance of the surface of the motor unit 30 facing the vehicle width direction can be increased.

In the present embodiment, the motor unit 30 includes through-holes 301, 302, and 303 at positions corresponding to the attachment portions 128, 129, and 143. A fixing member 501 that spans between the backbone frames 123L, 123R in the vehicle width direction is able to be attached to the attachment portion 128. The fixing member 501 is attached to the attachment portion 128 extending through the through-hole 301 to fix the motor unit 30 to the backbone frame 123. In a similar manner, a fixing member 502 is attached to the attachment portion 129 extending through the through-hole 302 to fix the motor unit 30 to the pivot frame 124. Also in a similar manner, a fixing member 503 is attached to the attachment portion 143 extending through the through-hole 303 to fix the motor unit 30 to the support frame 142.

Note that configurations other than the configuration described above for fixing the motor unit 30 to the vehicle body frame 10 may be employed, including, for example, a configuration for fixing the motor unit 30 to a left and right pair of portions via bolt fastening or the like.

Also, in the present embodiment, the motor unit 30 is fixed to the attachment portions of the backbone frame 123, the pivot frame 124, and the support frame 142. However, the configuration for frames provided with attachment portions is not limited thereto. For example, a configuration in which an attachment portion is provided at two sections on the backbone frame 123 and one section on the support frame 142, or a configuration in which an attachment portion is provided at two sections on the pivot frame 124 and one section on the support frame 142 may be employed. Also, in the configurations described above, the attachment portion may be provided on the seat rail 141 instead of the support frame 142. Also, for example, another configuration for the attachment portions in which the attachment portions are provided on brackets or the like extending from the frames may be employed.

Also, the control unit 40 at a portion overlapping with the seat rail 141 in a side view of the vehicle is sandwiched between the pivot frames 124 via a non-illustrated fixing structure. Because the control unit 40 can be disposed in the space beneath the seat, more housing space for the battery 16 can be created in the housing portion 10a. Also, because the control unit 40 is sandwiched between the seat rails 141, which have high rigidity, the attachment rigidity of the control unit 40 can be improved.

Next, the configuration of a cooling circuit of the present embodiment will be described with reference to FIGS. 1 and 2. The heat exchanger 24 according to the present embodiment is a radiator, and the cooling medium is a cooling fluid (coolant).

The cooling medium cooled at the heat exchanger 24 circulates to the motor unit through the inside of a first tube shaped member 251. Here, the first tube shaped member 251 extends rearward from the heat exchanger 24 along the backbone frame 123R, then extends upward, then extends along a lower surface of the control unit 40, and then connects to the motor unit 30. A water jacket is formed on a back surface (surface on the opposite side of the surface provided with the deceleration portion 32 and the like) of the motor unit 30, and the cooling medium passes through the water jacket to cool the motor unit 30. The cooling medium having passed through the water jacket is circulated to the heat exchanger 24 through the inner portion of a second tube shaped member 252. Here, the second tube shaped member 252 extends from the motor unit 30 along the backbone frame 123R and connects to the heat exchanger. In other words, the circulation path 25 includes the first tube shaped member 251, the motor unit 30, and the second tube shaped member 252. The cooling medium circulates through the circulation path 25 in order from the heat exchanger 24, the motor unit 30, and the heat exchanger 24.

In the present embodiment, the first tube shaped member 251 and the second tube shaped member 252, at a portion extending along the backbone frame 123, pass the side of the battery 16. Thus, the cooling medium can cool the battery 16 when passing through the first tube shaped member 251 and the second tube shaped member 252. Also, because the first tube shaped member 251 extends along a lower surface of the control unit, the cooling medium can cool the control unit 40 when the cooling medium passes through the first tube shaped member 251.

In the present embodiment, a flexible hose is used for the first tube shaped member 251 and the second tube shaped member 252. However, a pipe-shaped metal member or the like may also be used, for example. Note that in the present embodiment, the heat exchanger 24 is a radiator, but an oil cooler may also be used. In the case in which an oil cooler is used, the first tube shaped member 251 and the second tube shaped member 252 may connect to the inner portion of the motor unit 30, allowing the cooling medium, i.e., oil, to also lubricate the inner portion of the motor unit 30.

OTHER EMBODIMENTS

Figure 7:
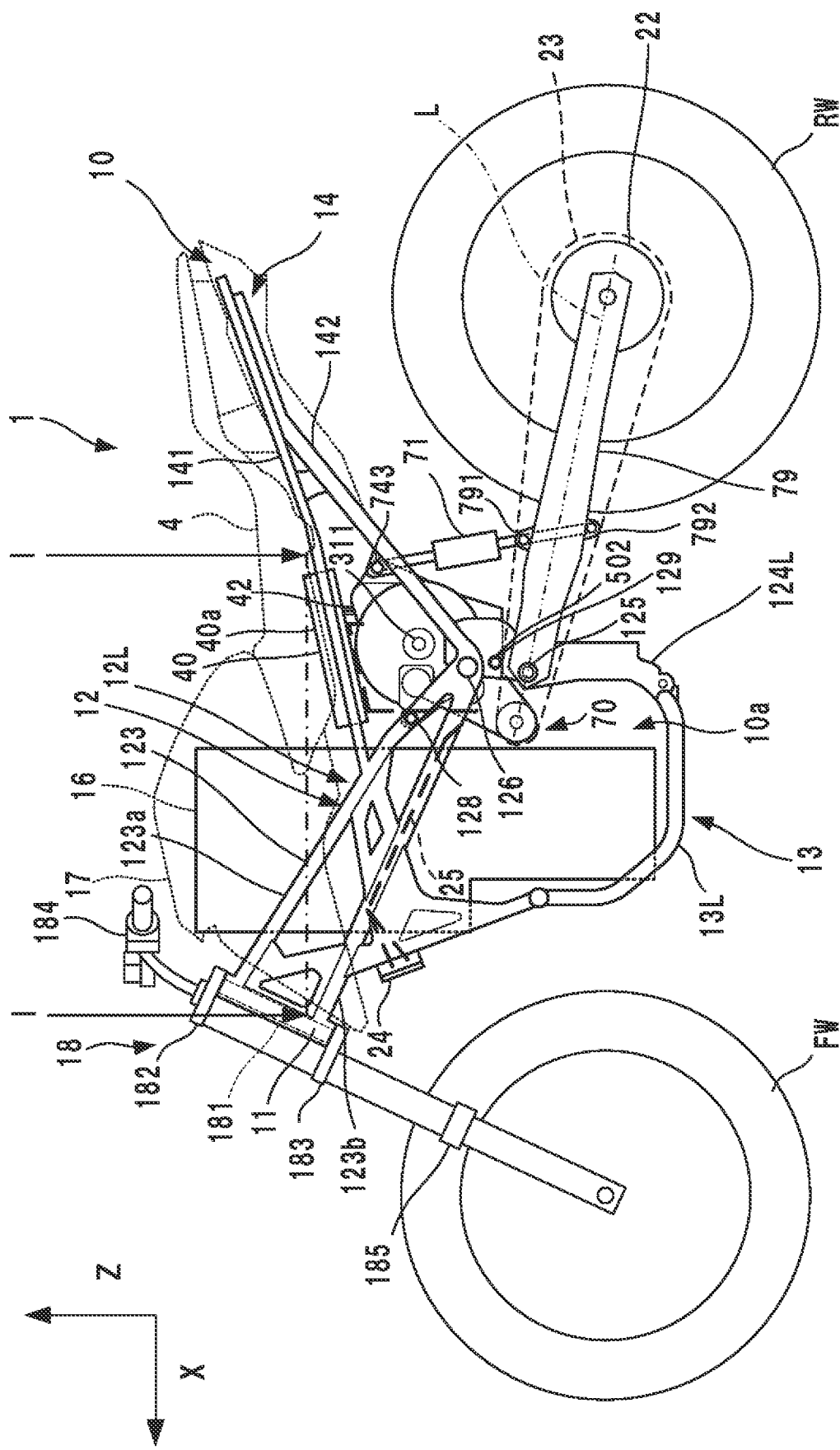
FIG. 7 is a left side view of a straddle type electric vehicle according to another embodiment.

In the embodiment described above, a left and right pair of rear suspensions are provided. However, a configuration may be employed in which a single rear suspension is provided. FIG. 7 is a diagram illustrating the arrangement configuration of a rear suspension 71 according to another embodiment.

In the present embodiment, the single rear suspension 71, functioning as a shock absorber that dampens the swing of a swing arm 79, is provided rearward from a motor unit 70 in the vehicle longitudinal direction. An upper attachment portion 743 provided on the motor unit 70 is attached to an upper portion of the rear suspension 71. The upper attachment portion 743 supports the rear suspension 71 and is fixed to the support frame 142 by a non-illustrated fixing structure. Also, lower attachment portions 791, 792 provided on the swing arm 79 are attached to a lower portion of the rear suspension 71. The rear suspension 71 and the swing arm 79 are disposed partially overlapping one another in a side view of the vehicle, and, at the overlapping portion, the rear suspension 71 is disposed between a left and right pair of portions of the swing arm 79.

With this configuration, a single rear suspension 71 can be installed, allowing the number of configuration components to be reduced. Also, because the rear suspension 71 is disposed between the left and right pair of portions of the swing arm 79, the rear suspension 71 can be disposed in a central region in the vehicle width direction. This helps prevent configuration components from projecting outward in the vehicle width direction. Furthermore, due to the upper attachment portion 743 provided on the motor unit 70, the rear suspension 71 is disposed close to the motor unit 70. In this way, the motor unit 70 and the rear suspension 71, which are heavy objects, can be disposed close to the center in the vehicle longitudinal direction. This improves the stability of the vehicle.

Note that in the present embodiment, the swing arm 79 includes the lower attachment portion at two sections. However, a configuration in which the rear suspension 71 is supported at one section may also be employed.

SUMMARY OF EMBODIMENTS

The embodiments described above disclose at least the following vehicle.

1. A straddle type electric vehicle according to the embodiment described above is a straddle type electric vehicle (for example, 1), including:
  a front wheel (for example, FW) and a rear wheel (for example, RW);
  a head pipe (for example, 11) that supports a steering mechanism for steering the front wheel;
  a main frame (for example, 12) that is connected to the head pipe, and that extends in a vehicle longitudinal direction:
  a motor unit (for example, 30) including an electric motor that outputs a driving force to rotate the rear wheel:
  a battery (for example, 16) that supplies power to the motor unit; and
  a swing arm (for example, 19) swingably supported by a pivot shaft (for example, 125) provided on the main frame, the swing arm rotatably supporting the rear wheel, wherein
  the motor unit and the battery are supported by the main frame between the front wheel and the rear wheel,
  the main frame includes a left and right pair of portions (for example, 12L, 12R);
  the motor unit is located between the left and right pair of portions in a top view of the vehicle and is disposed overlapping the main frame in a side view of the vehicle, and a motor shaft (for example, 311) of the electric motor is disposed above the pivot shaft and rearward in the vehicle longitudinal direction.

According to this embodiment, the motor unit is disposed between the main frames. This can create more housing space for the battery in the remaining space. In this way, a straddle type electric vehicle in which more housing space for a battery can be ensured is provided. Also, because the motor shaft is disposed rearward from the pivot shaft, the battery, which is a heavy object, can be centrally disposed with respect to the main frame.

2. The straddle type electric vehicle according to the embodiment described above, further including
  a left and right pair of seat frames (for example, 14) extending from the left and right pair of portions of the main frame in the vehicle longitudinal direction, wherein
  in a side view of the vehicle, the motor unit is disposed overlapping the left and right pair of seat frames, and
  the seat frames are each provided with a motor unit fixing portion (for example, 143) that supports the motor unit.

According to this embodiment, the motor unit is supported by the seat frames. This can increase the support rigidity of the motor unit.

3. The straddle type electric vehicle according to the embodiment described above, further including
  a control unit (for example, 40) that executes drive control of the motor unit, wherein
  the seat frames each include a seat rail (for example 141) and a support frame (for example, 142) extending rearward from the main frame below the seat rail,
  the motor unit is supported by the support frames, and
  the control unit is supported by the seat rails above the motor unit.

According to this embodiment, the control unit is disposed upward from and close to the motor unit. This allows the connection members thereof to be shortened. Also, because the motor unit and the control unit are both supported by the seat frames, positional offset between the two can be prevented. Thus, wire breakage and the like of the connection member can be prevented and support rigidity thereof can be increased.

4. The straddle type electric vehicle according to the embodiment described above, wherein
  the motor unit includes a deceleration portion (for example, 32), the deceleration portion includes a reduction gear (for example, 32b) for decelerating a rotational driving force of the electric motor and an output shaft (for example, 322) for outputting rotational driving force decelerated by the reduction gear,
  the motor shaft, in a side view of the vehicle, is disposed in a region (for example, A) surrounded by the main frame, the seat rail, and the support frame, and
  the output shaft is disposed frontward from the pivot shaft in the vehicle longitudinal direction.

According to this embodiment, the motor shaft is disposed in the space beneath the seat. This can create more housing space for the battery in the remaining space.

5. The straddle type electric vehicle according to the embodiment described above, wherein
  an oil pan (for example, 33) is provided on a lower portion of the motor unit, and
  the oil pan is disposed projecting rearward from the main frame in the vehicle longitudinal direction.

According to this embodiment, the oil pan is disposed projecting rearward from the main frame. Thus, the oil pan can easily come into contact with traveling winds and the like and the cooling efficiency of the oil can be improved.

6. The straddle type electric vehicle according to the embodiment described above, wherein
a rear portion of the main frame is provided with a left and right pair of pivot frames (for example, 124L, 124R), and
at least a portion of the motor unit is disposed between the left and right pair of pivot frames.

According to this embodiment, the motor unit can be disposed more to the rear, his can create more housing space for the battery in the region to the front.

7. The straddle type electric vehicle according to the embodiment described above, wherein
the swing arm is provided with lower attachment portions (for example, 791, 792) to which a lower portion of a shock absorber is attached, and
the motor unit is provided with an upper attachment portion (for example, 743) to which an upper portion of the shock absorber is attached.

According to this embodiment, due to the upper attachment portion provided on the motor unit, the rear suspension 71 is disposed close to the motor unit. In this way, the motor unit and the rear suspension, which are heavy objects, can be disposed close to the center in the vehicle longitudinal direction. This improves the stability of the vehicle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A straddle type electric vehicle comprising:
   a front wheel and a rear wheel;
   a head pipe that supports a steering mechanism for steering the front wheel;
   a main frame that is connected to the head pipe, and that extends in a vehicle longitudinal direction;
   a motor unit including an electric motor that outputs a driving force to rotate the rear wheel;
   a battery that supplies power to the motor unit; and
   a swing arm swingably supported by a pivot shaft provided on the main frame, the swing arm rotatably supporting the rear wheel,
   wherein the motor unit and the battery are supported by the main frame between the front wheel and the rear wheel,
   wherein the main frame includes a left and right pair of portions,
   wherein the motor unit is located between the left and right pair of portions in a top view of the vehicle and is disposed overlapping the main frame in a side view of the vehicle, and
   wherein a motor shaft of the electric motor is disposed above the pivot shaft and rearward in the vehicle longitudinal direction,
   wherein the straddle type electric vehicle further comprises a left and right pair of seat frames extending from the left and right pair of portions of the main frame in the vehicle longitudinal direction,
   wherein, in a side view of the vehicle, the motor unit is disposed overlapping the left and right pair of seat frames, and
   wherein the seat frames are each provided with a motor unit fixing portion that supports the motor unit.

2. The straddle type electric vehicle according to claim 1, further comprising:
   a control unit that executes drive control of the motor unit,
   wherein the seat frames each include a seat rail and a support frame extending rearward from the main frame below the seat rail,
   wherein the motor unit is supported by the support frames, and
   wherein the control unit is supported by the seat rails above the motor unit.

3. The straddle type electric vehicle according to claim 2,
   wherein the motor unit includes a deceleration portion,
   wherein the deceleration portion includes a reduction gear for decelerating a rotational driving force of the electric motor and an output shaft for outputting rotational driving force decelerated by the reduction gear,
   wherein the motor shaft, in a side view of the vehicle, is disposed in a region surrounded by the main frame, the seat rail, and the support frame, and
   wherein the output shaft is disposed frontward from the pivot shaft in the vehicle longitudinal direction.

4. The straddle type electric vehicle according to claim 1,
   wherein an oil pan is provided on a lower portion of the motor unit, and
   wherein the oil pan is disposed projecting rearward from the main frame in the vehicle longitudinal direction.

5. The straddle type electric vehicle according to claim 1,
   wherein a rear portion of the main frame is provided with a left and right pair of pivot frames, and
   wherein at least a portion of the motor unit is disposed between the left and right pair of pivot frames.

6. The straddle type electric vehicle according to claim 1,
   wherein the swing arm is provided with a lower attachment portion to which a lower portion of a shock absorber is attached, and
   wherein the motor unit is provided with an upper attachment portion to which an upper portion of the shock absorber is attached.

* * * * *